United States Patent

Nodelman et al.

Patent Number: 5,502,147
Date of Patent: Mar. 26, 1996

[54] ALIPHATIC RIM ELASTOMERS

[75] Inventors: Neil H. Nodelman, Pittsburgh; David D. Steppan, Gibsonia; Albert Magnotta, Monaca; Robert M. Loring, Library; Richard E. Keegan, McMurray, all of Pa.; William E. Slack, Moundsville, W. Va.

[73] Assignee: Bayer Corporation, Pittsburgh, Pa.

[21] Appl. No.: 171,282

[22] Filed: Dec. 21, 1993

[51] Int. Cl.$^6$ .................................... C08G 18/14
[52] U.S. Cl. .................... 528/49; 264/41; 264/45.5; 264/51; 264/328.1; 264/328.2; 264/328.6; 521/155; 521/159; 521/160; 521/163; 521/170; 528/52; 528/53; 528/55; 528/58; 528/59; 528/60; 528/61; 528/65; 528/67; 528/76; 528/85
[58] Field of Search ................ 528/60, 55, 65, 528/76, 59, 61, 85, 58, 52, 53, 49, 67; 264/41, 51, 45.5, 328.1, 328.2, 328.6; 521/155, 159, 160, 163, 170

[56] References Cited

U.S. PATENT DOCUMENTS

| | | | |
|---|---|---|---|
| 4,218,543 | 8/1980 | Weber et al. | 521/51 |
| 4,421,870 | 12/1983 | Stutz et al. | 521/160 |
| 4,526,905 | 7/1985 | Lucast et al. | 521/51 |
| 4,631,298 | 12/1986 | Presswood | 521/163 |
| 4,642,320 | 2/1987 | Turner et al. | 521/176 |
| 4,738,989 | 4/1988 | Smith | 521/107 |
| 4,764,543 | 8/1988 | Savina | 521/160 |
| 4,772,639 | 9/1988 | Pilger et al. | 521/124 |
| 4,937,366 | 6/1990 | Nodelman | 521/163 |
| 5,260,346 | 11/1993 | Cassidy et al. | 521/159 |

*Primary Examiner*—James J. Seidleck
*Assistant Examiner*—John M. Cooney, Jr.
*Attorney, Agent, or Firm*—Joseph C. Gil; N. Denise Brown

[57] ABSTRACT

The present invention is directed to polyurethane moldings produced via the RIM process. These polyurethane moldings have excellent reactivity, demold properties (at a 30 s demold), and good elongation and tear strength, and comprise the reaction product of an aliphatic polyisocyanate having a viscosity of less than about 20,000 mPa·s at 25° C. and a NCO functionality of 2.3 to 4.0 with an isocyanatereactive component comprising b1) a relatively high molecular weight organic compound containing at least one of the groups selected from the group consisting of hydroxy groups and amine groups; and b2) a low molecular weight chain extender selected from the group consisting of diols, triols, primary amines, secondary amines, aminoalcohols, and mixtures thereof; in the presence of a catalyst. The OH:NH ratio of the chain extender is from 1:1 to 25:1.

23 Claims, No Drawings

ALIPHATIC RIM ELASTOMERS

BACKGROUND OF THE INVENTION

The present invention relates to a process for the production of polyurethane moldings from a reaction mixture via the RIM process.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are suitable for a commercial RIM process are the aromatic isocyanates, such as, for example, diphenyl methane-4,4'-diisocyanate (i.e. MDI) and toluene diisocyanate (i.e. TDI).

Aliphatic isocyanates are broadly disclosed in the long list of suitable isocyanates for use in a RIM process in various patents, including, for example, U.S. Pat. No. 4,937,366. High productivity commercial RIM processes require a 30 s demold time, and prefer mold temperatures less than 80° C. for worker safety and energy efficiency.

U.S. Pat. No. 4,772,639 describes a process for the production of polyurethane moldings reacting organic polyisocyanates with organic compounds containing isocyanate-reactive hydrogen atoms in the presence of catalysts and auxiliary agents inside a closed mold. The isocyanate component is based on (a1) mixtures of (i) 1-isocyanate- 3,3,5-trimethyl-5-isocyanatomethylcyclohexane (i.e. IPDI), and (ii) polyisocyanates containing isocyanurate groups prepared by the trimerization of a portion of the isocyanate groups of 1,6-diisocyanatohexane, or (a2) (i) IPDI and (iii) polyisocyanates containing isocyanurate groups prepared by the trimerization of a portion of the isocyanate groups of a mixture of 1,6-diisocyanatohexane and IPDI. These reaction mixtures are broadly disclosed as being suitable for RIM processing. However, the reference requires unusually long demold times, i.e. from 3–10 minutes. These demold times are not commercially acceptable.

IPDI (i.e., 1-isocyanate-3,3,5-trimethyl-5-isocyanatomethyicyclohexane) is a sterically hindered tertiary cycloaliphatic isocyanate. In general, this isocyanate tends to slow down the reactivity of the entire system, which makes it less desirable to use commercially. Higher mold temperatures and/or longer demold times are generally necessary for systems based on IPDI. U.S. Pat. No. 4,772,639 clearly requires that at least 10% by weight of the IPDI monomer be used.

U.S. Pat. No. 4,642,320 discloses a process for the preparation of a molded polymer comprising reacting inside a closed mold a reaction mixture comprising (a) an active hydrogen containing material comprising a primary or secondary amine terminated polyether having an average equivalent weight of at least 500, (b) at least one chain extender, and (c) an aliphatic polyisocyanate, polyisothiocyanate, or mixture thereof, wherein the NCX index is from about 0.6 to 1.5. This process requires that component (a) have at least 25%, and preferably 50% of its active hydrogen atoms present in the form of amine hydrogens. All of the examples disclose a system based on a HDI prepolymer with amine terminated polyethers and diethyltoluene diamine at high mold temperatures and long demold times. The isocyanate used in the examples is difunctional, and contains at least 39% by weight of HDI monomer. Although the reference discloses aliphatic isocyanates are suitable for this process, the mold temperatures are higher than normal, i.e. at least 90° C., and the demold times range from about 1–5 minutes.

U.S. Pat. No. 4,764,543 discloses aliphatic RIM systems with short demold times (~10 seconds) and low mold temperatures (~70° C.) that use very fast reacting aliphatic polyamines. This patent is restricted to total polyurea systems based on chain extenders which are cycloaliphatic diamines and polyethers which are amine-terminated polyethers. All of the working examples of this patent use methylene bis(4-cyclohexylisocyanate) which is difunctional, and 100% monomer. The present invention is directed to a method of obtaining fast reacting RIM systems based on urethane/urea technology with slower reacting OH terminated soft segments and a mixed extender package consisting of alcohols and amines. This is surprising to one of ordinary skill in the art, especially when used with the slow reacting aliphatic isocyanates. In addition, the invention requires the use of higher functionality polyisocyanates which are widely regarded as unacceptable building blocks for RIM elastomers as they traditionally lead to unacceptable tear and tensile strengths.

The present invention has several advantages over these references. Amine terminated polyethers (i.e. ATPE's) are very expensive. Accordingly, the cost of RIM systems which are based primarily on ATPE's is significantly more than the cost of RIM systems which use conventional hydroxy group containing materials. The present systems are more economical in terms of cost as they use smaller quantities, or none, of amine-terminated polyethers. It is also possible to adjust the catalyst level of the present systems to fit the specific processing needs of various applications. In addition, certain isocyanates are difficult to handle and may pose serious health concerns to workers. in certain preferred embodiments of the presently claimed invention, the low monomer content of the polyisocyanate significantly decreases the health concerns and risks associated with handling polyisocyanates.

DESCRIPTION OF THE INVENTION

The present invention relates to polyurethane molding produced via the RIM process. These polyurethane moldings have excellent reactivity, demold properties and good elongations and tear strengths (at a 30 s demold), and comprise the reaction product of A) an aliphatic polyisocyanate having a viscosity of less than about 20,000 mPa·s at 25° C. and having an average NCO functionality of 2.3 to 4.0 with B) an isocyanate-reactive component comprising b1) at least one relatively high molecular weight organic compound containing at least one of the groups selected from the group consisting of hydroxy groups and amino groups, and b2) an organic chain extender selected from the group consisting of diols, triols, primary amines, secondary amines, amino alcohols, and mixtures thereof, wherein the OH:NH equivalent ratio of the chain extender is from 1:1 to 25:1, preferably from 1:1 to 15:1, and most preferably from 1:1 to 10:1; in the presence of C) at least one catalyst. In the invention, the amount of component B) and component C) totals 100%, and the components are processed via the one-shot process at an isocyanate index of 80 to 130, with the proviso that the aliphatic polyisocyanate contain less than 10% by weight of isophorone diisocyanate.

In particular, the present invention is directed to a process for the production of polyurethane moldings from a reaction mixture via the reaction injection molding process wherein the reaction mixture comprises the following components:

A) an aliphatic polyisocyanate having a viscosity of less than about 20,000 mPa·s at 25° C. and having an NCO functionality of 2.3 to 4.0, and selected from the group consisting of:
   a2) a polyisocyanate containing isocyanurate groups,
   a2) a polyisocyanate containing biuret groups,
   a3) a uretdione diisocyanate,
   a4) a polyisocyanate containing urethane groups,
   a5) a polyisocyanate containing allophanate groups,
   a6) a polyisocyanate containing isocyanurate and allophanate groups,
   a7) a polyisocyanate containing carbodiimide groups and/or uretone imines,
   a8) a polyisocyanate containing oxadiazinetrione groups, and
   a9) blends thereof;
with
B) an isocyanate-reactive component comprising
   b1) from about 30 to 94.9%, preferably 45 to 92.5%, and most preferably 66 to 92% by weight, based on the weight of component B) and component C), of at least one organic compound containing at least one of the groups selected from the group consisting of hydroxy groups and amine groups, and having an average functionality of from 1 to 4 and a molecular weight of from about 500 to 10,000, preferably about 1000 to 8000, and
   b2) from about 5 to 60%, preferably from 7 to 50% and most preferably from 7 to 30% by weight, based on the weight of component B) and component C), of an organic chain extender having a molecular weight of about 61 to 500, and preferably about 61 to 400, and being selected from the group consisting of diols, triols, primary amines, secondary amines, amino alcohols, and mixtures thereof, wherein the OH:NH equivalent ratio of the chain extender is from 1:1 to 25:1, preferably from 1:1 to 15:1, and most preferably from 1:1 to 10:1;
in the presence of
C) from 0.1 to 10%, preferably 0.5 to 5%, and most preferably I to 4% by weight, based on the weight of component B) and component C), of at least one catalyst;
wherein the amount of component B) and component C) totals 100%, and said components are processed via the one-shot process at an isocyanate index of 80 to 130, with the proviso that the aliphatic polyisocyanate contains less than 10% by weight of isophorone diisocyanate.

In the process of the invention, component B) may additionally comprise:
   b3) from about 0.5 to 25% by weight, based on the weight of component B) and component C), of at least one organic monofunctional alcohol having a molecular weight of about 32 to 500.

In a preferred embodiment of the invention, the catalyst comprises:
   c1) from 0.1 to 10% by weight of at least one catalyst selected from the group consisting of metal carboxylates, metal halides, ammonium carboxylates, and mixtures thereof,
   c2) from 0.0 to 10% by weight of at least one tin-sulfur catalyst, and
   c3) from 0.0 to 10% by weight of at least one tertiary amine;
wherein the amount of components c1), c2) and c3) total 0.1 to 10% by weight, based on the weight of component B) and component C).

The catalyst composition most preferably comprises from 0.5 to 5.0% by weight of component cl); from 0.0 to 5.0% by weight of component c2); and from 0.0 to 5.0% by weight of component c3), wherein the amount of components c1), c2) and c3) total 0.5 to 5% by weight, based on the weight of component B) and component C).

The embodiment wherein the reaction mixture additionally comprises antioxidants and/or UV stabilizers has been found to have special advantages for certain uses of these molded products. These elastomers have enhanced weathering performance which is advantageous for unpainted outdoor applications.

It has been found that this particular combination of materials gives excellent processing on RIM equipment, and results in molded pads having shod demold times with excellent green strength and good final tear properties. This is very surprising since the demold times were 30 s, which is typical of fast reacting systems based on aromatic isocyanates and not thought to be attainable with systems based on aliphatic isocyanates and glycol chain extenders.

In accordance with the present invention, the aliphatic polyisocyanate component having a viscosity of less than about 20,000 mPa·s at 25° C. and having an average NCO functionality of 2.3 to 4.0, is generally in the form of an NCO prepolymer or a polyisocyanate adduct, more preferably a polyisocyanate adduct. Suitable polyisocyanate adducts for the present invention may be based, for example, on organic aliphatic diisocyanates including, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)methane, 2,4'-dicyclohexylmethane diisocyanate, 1,3- and 1,4-bis-(isocyanatomethyl)-cyclohexane, bis-(4-isocyanato-3-methylcyclohexyl)methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or ,6-hexahydrotoluylene diisocyanate, and mixtures thereof. It is preferred that the isocyanate be based on 1,6-hexamethylene diisocyanate.

Suitable polyisocyanate adducts containing biuret groups include polyisocyanates such as those described, for example, in U.S. Pat. Nos. 3,124,605, 3,358,010, 3,644,490, 3,862,973, 3,906,126, 3,903,127, 4,051,165, 4,147,714, and 4,220,749, the disclosures of which are herein incorporated by reference. As set forth in these patents, these biuret group-containing polyisocyanates may be prepared by using co-reactants such as water, tertiary alcohols, primary and secondary monoamines, and primary and/or secondary diamines. These polyisocyanates preferably have an NCO content of 18 to 22% by weight and an average NCO functionality of 2.3 to 4.0, preferably of 3 to 3.5.

Suitable polyisocyanates containing isocyanurate groups include compounds such as those described, for example, in U.S. Pat. Nos. 4,288,586 and 4,324,879, the disclosures of which are herein incorporated by reference; European Patents 3,765, 10,589 and 47,452, the disclosures of which are herein incorporated by reference; and German Offenlegungsschrifien 2,616,416, herein incorporated by reference. The isocyanato-isocyanurates generally have an average NCO functionality of 2.3 to 4.0, preferably of 3 to 3.5, and an NCO content of 5 to 30%, preferably 10 to 25% and most preferably 15 to 25% by weight.

Uretdione diisocyanates may be prepared by oligomerizing a portion of the isocyanate groups of a diisocyanate in the presence of a trialkyl phosphine catalyst, and may be used in admixture with other aliphatic and/or cycloaliphatic polyisocyanates, particularly the isocyanurate group-containing polyisocyanates described hereinabove.

Urethane group-containing polyisocyanates which may be prepared in accordance with the process disclosed in U.S. Pat. No. 3,183,112, herein incorporated by reference, by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof.

Allophanate group-containing polyisocyanates include, for example, those prepared according to the processes disclosed in U.S. Pat. Nos. 3,769,318, 4,160,080 and 4,177, 342, the disclosures of which are herein incorporated by reference.

Isocyanurate and allophanate group-containing polyisocyanates include, for example, those which may be prepared in accordance with the processes set forth in U.S. Pat. Nos. 5,124,427, 5,208,334 and 5,235,018; the disclosures of which are herein incorporated by reference. These polyisocyanates containing isocyanurate and allophanate groups preferably have an NCO content of 16 to 22% by weight, most preferably of 18 to 21% by weight.

Suitable carbodiimide group-containing and uretone imine group-containing polyisocyanates for the present invention include, for example, those which may be prepared by oligomerizing di- or polyisocyanates in the presence of known carbodiimidization catalysts such as described in, for example, German Patentschrifien 1,092, 007, herein incorporated by reference, U.S. Pat. No. 3,152, 162, herein incorporated by reference, and German Offenlegungschrifien 2,504,400, 2,537,685 and 2,552,350, the disclosures of which are herein incorporated by reference.

It is also possible to use polyisocyanates containing oxadiazinetrione groups and containing the reaction product of two moles of a diisocyanate and one mole of carbon dioxide.

Preferred polyisocyanate adducts are the polyisocyanates containing isocyanurate groups a1), biuret groups a2), or polyisocyanates containing both isocyanurate and allophanate groups a6). Isocyanurate group-containing polyisocyanates suitable for the present invention generally have an average NCO functionality of about 2.3 to 4.0 and a viscosity of less than about 20,000 mPa·s at 25° C. The biuret group-containing polyisocyanates generally have an average NCO functionality of about 2.3 to 4.0 and a viscosity of less than about 20,000 mPa·s at 25° C. Polyisocyanates containing isocyanurate and allophanate groups generally have an average NCO functionality of about 2.3 to 4.0 and a viscosity of less than about 20,000 mPa·s at 25° C.

It is more preferred to use isocyanurate group-containing polyisocyanates as component a 1 ) which are prepared, for example, by trimerizing a portion of the isocyanate groups of 1,6-hexamethylene diisocyanate; containing tris-(6-isocyanatohexyl)-isocyanurate and higher homologs thereof; and having an NCO content of about 20–23% by weight, a monomeric diisocyanate content of <2%, a viscosity at 25° C. of less than 10,000 mPa·s and an average isocyanate (i.e. NCO) functionality of about 3 to 3.5. Suitable compounds include isocyanurate group-containing polyisocyanates such as those described, for example, in U.S. Pat. Nos. 4,288,586 and 4,324,879, the disclosures of which are herein incorporated by reference. Low monomer content polyisocyanates such as these significantly decrease health concerns and risks associated with handling polyisocyanates.

The more preferred polyisocyanates to be used as component a2) include, for example, tris-(6-isocyanatohexyl)-biuret or mixtures thereof with its higher homologs. These biuret group-containing polyisocyanates generally have a NCO content of about 18 to 25% by weight and an average NCO functionality of about 2.3 to 4.0. Suitable biuret group-containing polyisocyanates include polyisocyanates such as those described, for example, in U.S. Pat. No. 3,903,127, herein incorporated by reference. As mentioned hereinabove, low monomer content polyisocyanates such as these significantly decrease health concerns and risks associated with handling polyisocyanates.

Another more preferred group of polyisocyanate adduct includes the polyisocyanates containing isocyanurate and allophanate groups that are based on 1,6-hexamethylene diisocyanate. Suitable such compounds generally have an NCO content of from 16 to 22% by weight, and a viscosity of less than about 3000 mPa·s at 25° C. Some examples of suitable isocyanates include, for example, those compounds described, for example, in U.S. Pat. Nos. 5,124,427, 5,208, 334, and 5,235,018, the disclosures of which are herein incorporated by reference. These polyisocyanates also contain low quantities of monomeric isocyanates.

A most preferred isocyanurate group-containing polyisocyanate to be used as component a1) can be prepared from 1,6-hexamethylene diisocyanate and having an isocyanate content of about 21.6%, a content of monomeric diisocyanate of <0.2%, and a viscosity at 25° C. of about 3000 mPa·s.

A most preferred biuret group-containing polyisocyanate to be used as component a2) of the invention can be prepared from 1,6-hexamethylene diisocyanate and having an isocyanate content of about 23%, a content of monomeric diisocyanate of <0.7% and a viscosity at 25° C. of about 1300–2200.

A most preferred polyisocyanate containing isocyanurate and allophanate groups to be used as component a6) can be prepared from 1,6-hexamethylene diisocyanate and 1-butanol, and has an isocyanate content of about 18 to 21% by weight such as described, for example, in U.S. Pat. No. 5,124,427, herein incorporated by reference. This preferred polyisocyanate component has an isocyanate content of about 18 to 21% by weight, a viscosity at 25° C. of less than about 1500 mPa·s, and a monomeric diisocyanate content of <0.7%.

The aliphatic polyisocyanate component contains less than 10% by weight of isophorone diisocyanate. As mentioned hereinabove, this particular isocyanate tends to slow down the reactivity of the entire RIM system. In addition, the aliphatic isocyanate component preferably contains less than 2.5%, most preferably less than 1%, by weight of monomeric isocyanate.

Also necessary for preparing molded products via the RIM process is an isocyanate reactive component, i.e. component B). According to the present invention, component B) comprises b1) at least one high molecular weight compound containing at least one of the groups selected from the group consisting of hydroxy groups and amine groups; and b2) a low molecular weight chain extender selected from the group consisting of diols, triols, primary amines, secondary amines, amino alcohols, and mixtures thereof, wherein the OH:NH equivalent ratio is from 1:1 to 25:1, preferably from 1:1 to 15:1, most preferably from 1:1 to 10:1.

The isocyanate-reactive component B) to be used in the process according to the invention comprises components b1) at least one compound containing at least one of the groups selected from the group consisting of hydroxy groups and amine groups, and having an average functionality of from 1 to 4 and a molecular weight of about 500 to 10,000, preferably from about 1000 to 8000. Examples of suitable compounds to be used as component b1) include the polyethers, polyesters, polythioethers, polyacetals, polycarbonates, and amine terminated polyethers containing from 1 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component b1) in the invention. Preferred polyethers include, for example, those compounds based on di- or tri-functional starters such as, for example, water, ethylene glycol, propylene glycol, glycerin, trimethylolpropane, or triethanolamine. These preferred compounds include copolymers of ethylene oxide and propylene oxide with greater than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers containing primary or secondary (preferably primary) aromatically or aliphatically (preferably aliphatically) bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. No. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds.

In another embodiment, the polyhydroxyl compound b1) may additionally comprise: i) a dispersion of a polyurea and/or polyhydrazodicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschrifien 2,324,134, 2,423,984, 2,512,385, 2,513,815, 2,550, 796, 2,550,797, 2,550,833, 2,550,862, 2,633,293, and 2,639, 254, the disclosures of which are herein incorporated by reference. See also U.S. Pat. Nos. 3,325,421, 4,042,537, 4,089,835, 4,293,470, 4,296,213, 4,374,209, and 4,7860706, the disclosures of which are herein incorporated by reference. Polyols of this type are commercially available from Miles Inc. and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

The isocyanate-reactive component B) additionally comprises component b2) a low molecular weight chain extender. Component b2) is an organic chain extender having a molecular weight of from 61 to 500, preferably from 61 to 400, and is selected from the group consisting of diols, triols, primary amines, secondary amines, amino alcohols, and mixtures thereof. Component b2) is selected such that the OH:NH equivalent ratio of the chain extender is from 1:1 to 25:1, preferably from 1:1 to 15:1, and most preferably from 1:1 to 10:1.

Suitable organic diols and triols to be used as component b2) according to the invention include, for example, diols and triols having a molecular weight of about 62 to 500, preferably about 62 to 400. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tdpropylene glycol, glycerol, trimethylolpropane, neopentyl glycol, cyclohexanedimethanol, and 2,2,4-trimethylpentane-1,3-diol. Preferred diols and triols include, for example, 1,4-butanediol and 2-methyl-1,3-propanediol.

Suitable amine compounds to be used as component b2) according to the invention include organic primary amines, secondary amines, and amino alcohols having molecular weights of about 61 to 500, preferably about 61 to 400. Some examples of these compounds include cyclohexylamine, 2-methyl-1,5-pentane diamine, diethanolamine, monoethanolamine, propylamine, butylamine, dibutylamine, hexylamine, monoisopropanolamine, diisopropanolamine, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof, and the like.

Other suitable amines include, for example, 1,8-p-diaminomenthane, bis(4-aminocyclohexyl)methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

it is also possible to use the so-called amine terminated polyethers having low molecular weights. Among the suitable amine terminated polyethers include, for example, those containing primary or secondary (preferably primary) aromatically or aliphatically (preferably aliphatically) bound amino groups, wherein amino end groups can also be attached to the polyether chain through urethane or ester groups. Suitable compounds include, for example, Jeffamine D400 and Jeffamine D230.

These low molecular weight amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551, 605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then convening the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. 4,506,039, 4,525,590, 4,532,266 and 4,532,317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds.

Preferred amine compounds for component b2) include cyclohexylamine, diethanolamine, dibutylamine, and monoethanolamine.

Other suitable amines to be used for component b2) include, for example, aromatic polyamines, including diamines, having molecular weights of less than 500. These aromatic diamines include, for example, 1-methyl-3,5-diethyl-2,4-diamino benzene, 1-methyl-3,5-diethyl-2,6-diamino benzene, 1,3,5-trimethyl-2,4-diamino benzene, 1,3, 5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4,4',4'-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable.

In accordance to the present invention, it is also possible that the isocyanate-reactive component B) include b3) at least one low molecular weight organic monofunctional alcohol. Suitable compounds to be used as component b3) include organic monofunctional alcohols having a molecular weight of about 32 to 500, preferably about 32 to 400. Examples of such compounds include, for example, methanol, ethanol, 1-propanol, 2-propanol, n-butanol, 2-ethyl-1-hexanol, stearyl alcohol, and alkyl substituted phenols containing from 1 to 22 carbon atoms in the alkyl group such as, for example, nonylphenol. Preferred compounds to be used as component b3) include n-butanol and 2-ethyl-1-hexanol.

The process of the invention also requires at least one catalyst capable of catalyzing the reaction between the isocyanate groups of A) and the isocyanate-reactive groups of B). It is preferred that the catalyst(s) is optimized both in terms of quantity and chemical composition so as to achieve a 30 s demold time in the process.

In a preferred embodiment, the catalyst comprises cl ) at least one catalyst selected from the group consisting of metal carboxylates, metal halides, ammonium carboxylates, and mixtures thereof. Of the metal halides, the metal chlorides are preferred. These catalysts may be used alone or in conjunction with c2) at least one tin-sulfur catalyst, and/or c3) at least one tertiary amine catalyst.

Some examples of catalysts suitable for use as cl) catalysts include metal carboxylates including, for example, tin carboxylates such as, for example, dimethyltin dilaurate, and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e. Dabco TMR). Tin carboxylates such as, for example, dimethyltin dilaurate, and bismuth carboxylates such as, for example, bismuth trineodecanoate are preferred catalysts to be used as component cl). Metal chlorides such as, for example, dimethyltin dichloride are also preferred catalysts to be used as component cl).

Suitable compounds to be used as tin-sulfur catalysts c2) include, for example, dialkyltin dilaurylmercaptides such as, for example, dibutyltin dilaurylmercaptide and dimethyltin dilaurylmercaptide.

Suitable catalysts to be used a:s tertiary amine catalysts c3) include, for example, triethylamine, triethylenediamine, tributylamine, N-methylmorpholine, N-ethylmorpholine, triethanolamine, triisopropanolamine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bishydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 80 to 130 (preferably from 90 to 115). By the term "Isocyanate Index" (also commonly referred to as NCO index), is defined herein as the equivalents of isocyanate, divided by the total equivalents of isocyanate-reactive hydrogen containing materials, multiplied by 100.

In general, in a RIM process, two separate streams are intimately mixed and subsequently injected into a suitable mold, although it is possible to use more than two streams. The first stream contains the polyisocyanate component, while the second stream contains the isocyanate reactive components and any other additive which is to be included.

The invention is further illustrated but is not intended to be limited by the following examples in which all parts and percentages are by weight unless otherwise specified.

EXAMPLES

Example 1: A B-side mixture was prepared by blending 66 pads by weight (pbw) of Polyol A, 24 pbw Diol A, 4 pbw Pigment A, 1 pbw Irganox 245, 3 pbw tinuvin 765 and 2 pbw Catalyst A together and thoroughly mixed. They were put into the B-side of a Hennecke RIMDOMAT RIM machine. The appropriate quantity of Isocyanate A to achieve an isocyanate index of 105 was loaded into the A-side. The RIMDOMAT was equipped with a Hennecke mq8 Mixhead. The B-side was preheated to 40°–45° C. and the A-side was heated to 55°–60° C. The materials were injected at a 105 isocyanate index at an injection pressure of 200 bar and an injection rate of 200 grams/sec. The material was injected into a flat plaque mold of 3×200×300mm heated to 67° C., and sprayed with Chemtrend 2006 mold release spray. After a 30 s dwell time, the part was demolded. Physical properties were determined in accordance with ASTM standards. Other RIM examples were performed in an identical manner, except for the pbw of various components.

ASTM methods used were as follows:

| | |
|---|---|
| D790 | flexural modulus |
| D412 | tensile strength; and elongation |
| D624 | die C tear strength |

The following components were used in Examples 1A–1C.

Polyol A: a glycerin started propylene oxide/ethylene oxide polyether (83 wt.% PO, 17wt.% EO) and having an OH number of about 35

Diol A: 1,4-butanediol

Diol B: 2-methyl-1,3-propanediol

Amino Alcohol A: monoethanolamine (i.e. MEOA)

Catalyst A: Fomrez UL-28, dimethyltin dilaurate, commercially available from Witco Corp.

Pigment A: a blend of Polyol B (91.1 wt.%) and carbon black (8.9 wt.%)

Polyol B: a glycerin started propylene oxide/ethylene oxide polyether (87 wt.% PO, 13 wt.% EO) and having an OH number of about 28

Irganox 245: an antioxidant, commercially available from Ciba-Geigy Inc.

Tinuvin 765: an UV stabilizer, commercially available from Ciba-Geigy Inc.

Isocyanate A: a biuret group-containing polyisocyanate prepared from 1,6-hexamethylene diisocyanate and having an isocyanate content of about 23% by weight, a content of monomeric diisocyanate of <0.7% and a viscosity at 25° C. of 1300–2200 mPa·s.

Some RIM examples are given in Table I below. Example 1A is comparative, and Examples 1B and 1C are according to the present invention. Examples 1B and 1C exhibit dramatically improved demold integrity along with improved hot tear at demold. The final physical properties (given parallel, i.e. PA, and perpendicular, i.e. PP, to the direction of flow in the mold) indicate improved tensile and tear strength of the final molded pads produced in Examples 1B and 1C.

TABLE 1

| Example: | 1A | | 1B | | 1C | |
|---|---|---|---|---|---|---|
| Polyol A | 66 | | 69 | | 63 | |
| Diol A | 24 | | 17 | | | |
| MEOA | | | 4 | | 4 | |
| Pigment A | 4 | | 4 | | 4 | |
| Irganox 245 | 1 | | 1 | | 1 | |
| Tinuvin 765 | 3 | | 3 | | 3 | |
| Catalyst A | 2 | | 2 | | 2 | |
| Diol B | | | | | 23 | |
| Isocyanate A NCO Index: | 105 | | 105 | | 105 | |
| Physical Properties | PA | PP | PA | PP | PA | PP |
| Flexural Modulus (psi) | 12900 | 4200 | 11000 | 4500 | 47000 | 14500 |
| Elongation (%) | 93 | 65 | 102 | 55 | 72 | 55 |
| Tensile Strength (psi) | 1727 | 1400 | 2300 | 1850 | 2680 | 2200 |
| Die C Tear (pli) | 62 | 25 | 220 | 70 | 635 | 230 |
| Demold Characteristics | | | | | | |
| Hot Tear Comments | Poor Limp | | Very Good Springy | | Exc. Springy | |
| Greenstrength | Soft, Weak | | Firm, Strong | | Very tough | |

Example 2A–2C used the following components in addition to those described hereinabove under Examples 1A–1C:

Alcohol A: n-butanol

Amine A: cyclohexylamine

Some RIM examples are given in Table 2 below. Example 2A is comparative. Examples 2B, 2C, and 2D are according to the invention. For Example 2A, the part demolds limp in 30 seconds, the standard RIM demold time, and has poor hot tear strength. A significant improvement is shown by Examples 2B, 2C, and 2D. The greenstrength is improved and the final tear strength and elongation are dramatically improved. Also, the properties of Examples 2B and 2D are further improved in comparison to Example 2C in terms of elongation and tear strengths.

TABLE 2

| Example: | 2A | | 2B | | 2C | | 2D | |
|---|---|---|---|---|---|---|---|---|
| Polyol A: | 66 | | 60 | | 70 | | 63 | |
| Diol A | 24 | | 20 | | 16 | | 16 | |
| MEOA | | | | | 4 | | 4 | |
| Pigment A | 4 | | 4 | | 4 | | 4 | |
| Irganox 245 | 1 | | 1 | | 1 | | 1 | |
| Tinuvin 765 | 3 | | 3 | | 3 | | 3 | |
| Catalyst A | 2 | | 2 | | 2 | | 2 | |
| Amine A | | | 10 | | | | | |
| Alcohol A | | | | | | | 7 | |
| Isocyanate A NCO Index: | 105 | | 105 | | 105 | | 105 | |
| Physical Properties | PA | PP | PA | PP | PA | PP | PA | PP |
| Flexural Modulus (psi) | 12900 | 4200 | 21900 | 12340 | 9500 | 4300 | 8200 | 2100 |
| Elongation (%) | 93 | 65 | 122 | 105 | 72 | 75 | 120 | 110 |
| Tensile Strength (psi) | 1727 | 1400 | 2650 | 1950 | 1960 | 1700 | 1930 | 1350 |
| Die C Tear (pli) | 62 | 25 | 363 | 180 | 104 | 58 | 320 | 130 |
| Demold Characteristics | | | | | | | | |
| Hot Tear | Poor | | Exc | | Very good | | Exc | |
| Comments | Limp | | Springy | | Springy | | Springy | |
| Greenstrength | Soft, Weak | | Very tough | | Tough | | Very tough | |

Examples 3A and 3B use the following components in addition to those described hereinabove.

TEOA: triethanolamine

Isocyanate B: a polyisocyanate containing isocyanurate and allophanate groups, based on 1,6-hexamethylene diisocyanate, having a viscosity of about 822 mPa·s at 25° C., an NCO content of about 19.3%, and a free monomer content of about 0.22% by weight; and prepared by the following procedure:

To a reactor equipped with a gas bubbler, stirrer, thermometer and lo dropping funnel 100 pads of hexamethylene diisocyanate (HDI) were added. The stirred HDI was heated to 90° C. while dry nitrogen was bubbled through the HDI. To the stirred HDI, 4.4 pads of 1-butanol, containing 0.0031 pads of trimethylbenzyl ammonium hydroxide were added, at such a rate that the 90° C. temperature was maintained. After the addition was complete, the reaction mixture was held at 90° C. for an additional 15 minutes, followed by the addition of 0.0031 pads of di(2-ethylhexyl)phosphate. The reaction mixture had an NCO content of 34.6%. The excess monomer was removed by wiped thin film evaporation to provide an almost colorless (APHA 25) liquid having a viscosity of 822 mPa·s at 25° C., an NCO content of 19.3%, and a free monomer (HDI) content of 0.22%.

TABLE 3

| Example: | 3A | | 3B | |
|---|---|---|---|---|
| Polyol A | 74 | | 62.5 | |
| MEOA | 18.5 | | 3 | |
| TEOA | | | 6 | |
| Diol B | | | 21 | |
| Pigment A | 1.5 | | 1.5 | |
| Irganox 245 | 1 | | 1 | |
| Tinuvin 765 | 3 | | 3 | |
| Catalyst A | 2 | | 2 | |
| Isocyanate B NCO Index: | 105 | | 105 | |
| Physical Properties | PA | PP | PA | PP |
| RT Flex (psi) | 5310 | 5085 | 1200 | 1100 |
| Elongation (%) | 120 | 70 | 130 | 130 |
| Tensile Strength (psi) | 1980 | 1430 | 1740 | 1630 |
| Die C Tear (pli) | 150 | 105 | 130 | 130 |
| Demold Characteristics | | | | |
| Hot Tear | very good | | very good | |
| Comments | slightly limp | | slightly limp | |
| Greenstrength | tough | | tough | |

Both examples 3A and 3B processed well with acceptable performance.

Examples 4A–4H used the following components in addition to those described hereinabove under Examples 1A–1C:

Polyol C: a propylene glycol started propylene oxide/ethylene oxide polyether (80 wt.% PO, 20 wt.% EO) and having an OH number of about 28

Catalyst B: Fomrez UL-22: dimethyltin dilaurylmercaptide, commercially available from Witco corp.

Catalyst C: Coscat 83: bismuth trineodecanoate, commercially available from Cosan Chemical Company Isocyanate C: an isocyanurate group-containing polyisocyanate prepared from 1,6-hexamethylene diisocyanate and having an isocyanate content of 21.6%, a content of monomeric diisocyanate of <0.2% and a viscosity at 25° C. of 3000 mPa·s

TABLE 4

| Example | 4A | 4B | 4C | 4D | 4E | 4F | 4G | 4H |
|---|---|---|---|---|---|---|---|---|
| Polyol C | 68.5 | 68.5 | 68.5 | 68.5 | 68.5 | 68.5 | 68.5 | 65.2 |
| Diol B | 18.5 | 18.5 | 18.5 | 18.5 | 18.5 | 18.5 | 18.5 | 17.0 |
| MEOA | 3 | 3 | 3 | 3 | 3 | 3 | 3 | 4 |
| Pigment A | 4 | 4 | 4 | 4 | 4 | 4 | 4 | 4 |
| Tinuvin 765 | 3 | 3 | 3 | 3 | 3 | 3 | 3 | 3 |
| Irganox 245 | 1 | 1 | 1 | 1 | 1 | 1 | 1 | 1 |
| Catalyst A | 2 | | 1.5 | 1.0 | 0.5 | 1.0 | 1.5 | |
| Catalyst B | | 2 | | | | | | |
| Alcohol A | | | | | | 1.0 | 0.5 | 3.8 |
| Catalyst C | | | | | | | | 2.0 |
| Isocyanate C NCO Index: | 105 | 105 | 105 | 105 | 105 | 105 | 105 | 105 |

TABLE 4-continued

| Example | 4A | 4B | 4C | 4D | 4 E | 4F | 4G | 4H |
|---|---|---|---|---|---|---|---|---|
| Gel Time (sec) | 3.5 | 7.5 | 4.0 | 5.5 | 6.5 | 5.5 | 4.0 | 6.5 |
| Hot Tear[(1)] (green strength) | E | VP | G | F | P | G | VG | F |
| Flash | ** | * | * | * | * | * | ** | ** |

*flash does not demold with the part
**flash is tough and demolds with the part
(1)results are interpreted as follows:
E = excellent
G = good
P = poor
VG = very good
F = fair
VP = very poor The experiments in Table 4 exhibit a range of processing characteristics as a function of catalyst type and amount. In Example 4A, 2 pads of Catalyst A result in a pad with the best tear strength upon demolding, it also represents the system with the fastest gel time. Reducing the catalyst quantity to 1 pad as in Example 4D, results in a significantly longer gel time and accordingly, better flow characteristics. However the tear strength is only fair. After about one minute, when the pad cools, the tear strength of the part becomes excellent. The combination of 1 pad of Catalyst B and 1 part of Catalyst A, as in Example 4F, improves the hot tear strength without reducing the gel time. This example represents a preferred catalyst system to be used in the invention. Example 4H uses 2 pads of Catalyst C and results in an even longer gel time than Example 4F. The hot tear strength of Example 4H is only fair. However, the tear strength becomes excellent after the pad is out of the mold for about one minute. Example 4B, which uses 2 pads of Catalyst B, has the longest gel time of all the examples. However, more catalyst would be required to achieve good green strength. The tear strength is unacceptably poor and remains poor even after the part is cooled when using 2 pads of Catalyst B.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane moldings from a reaction mixture by a reaction injection molding process, wherein said reaction mixture comprises the following components:

A) an aliphatic polyisocyanate having a viscosity of less than about 20,000 mPa·s at 25° C. and having a NCO functionality of 2.3 to 4.0, said polyisocyanate being selected from the group consisting of
   a1) a polyisocyanate containing isocyanurate groups,
   a2) a polyisocyanate containing biuret groups,
   a3) a uretdione diisocyanate,
   a4) a polyisocyanate containing urethane groups,
   a5) a polyisocyanate containing allophanate groups,
   a6) a polyisocyanate containing isocyanurate and allophanate groups,
   a7) a polyisocyanate containing carbodiimide groups and/or uretone imine groups,
   a8) a polyisocyanate containing oxadiazinetrione groups, and
   a9) blends thereof;
with
B) an isocyanate-reactive component comprising
   b1) from about 30 to 94.9% by weight, based on the weight of component B), of at least one compound containing at least one of the groups selected from the group consisting of hydroxy-groups and amine-groups, and having an average functionality of from 1 to 4 and a molecular weight of from about 500 to 10,000, and
   b2) from about 5 to 60% by weight, based on the weight of component B) and component C), of an organic chain extender having a molecular weight of from 61 to 500 and being selected from the group consisting of diols, triols, primary amines, secondary amines, amino alcohols and mixtures thereof, wherein the OH:NH equivalent ratio of said chain extender is from 1:1 to 25:1,
in the presence of
C) from 0.1 to 10% by weight, based on the weight of component B) and component C), of at least one catalyst,
wherein the amount of component B) and component C) totals 100%, and said components are processed via the one-shot process at an isocyanate index of 80 to 130, with the proviso that said aliphatic polyisocyanate contains less than 10% by weight of isophorone diisocyanate.

2. The process of claim 1 wherein B) said isocyanate-reactive component additionally comprises:
   b3) from about 0.5 to 25% by weight, based on the weight of component B) and component C), of at least one organic monofunctional alcohol having a molecular weight of from 32 to 500.

3. The process of claim 1, wherein b1) said, hydroxy group containing compound is a polyether polyol.

4. The process of claim 1, wherein said catalyst C) comprises
   c1) from 0.1 to 10% by weight, based on the weight of component B) and component C), of at least one catalyst selected from the group consisting of metal carboxylates, metal halides, ammonium carboxylates, and mixtures thereof,
   c2) from 0.0 to 10 % by weight, based on the weight of said isocyanate-reactive components, of at least one tin-sulfur catalyst, and
   c3) from 0.0 to 10% by weight, based on the weight of said isocyanate-reactive components, of at least one tertiary amine catalyst,
wherein the amount of components c1), c2), and c3) totals 0.1 to 10% by weight, based on the weight of component B) and component C).

5. The process of claim 1, wherein said component B) comprises from 45 to 92.5% by weight, based on the weight of component B) and component C), of said component b1).

6. The process of claim 1, wherein said component B) comprises from 7 to 50% by weight, based on the total weight of component B) and component C), of said component b2).

7. The process of claim 1, wherein said component B) comprises from 66 to 92% by weight, based on the total weight of component B) and component C), of said component b1).

8. The process of claim 1, wherein said component B) comprises from 7 to 30% by weight, based on the total weight of component B) and component C), of said component b2).

9. The process of claim 1, wherein said reaction mixture comprises from 0.5 to 5% by weight, based on the weight of component B) and component C), of said catalyst.

10. The process of claim 1, wherein said reaction mixture comprises from 1 to 4% by weight, based on the weight of component B) and component C), of said catalyst.

11. The process of claim 1 wherein said catalyst C) comprises
   c1) from 0.5 to 5.0% by weight, based on the weight of component B) and component C), of at least one catalyst selected from the group consisting of metal carboxylates, metal halides, ammonium carboxylates, and mixtures thereof,
   c2) from 0.0 to 5.0% by weight, based on the weight of component B) and component C), of at least one tin-sulfur catalyst, and
   c3) from 0.0 to 5.0% by weight, based on the weight of component B) and component C), of at least one tertiary amine catalyst,
wherein the amount of components c1), c2), and c3) totals 0.5 to 5.0% by weight, based on the weight of component B) and component C).

12. The process of claim 1 wherein said catalyst C) comprises
   c1) from 1 to 4.0% by weight, based on the weight of component B) and component C), of at least one catalyst selected from the group consisting of metal carboxylates, metal halides, ammonium carboxylates, and mixtures thereof,
   c2) from 0.0 to 4.0% by weight, based on the weight of component B) and component C), of at least one tin-sulfur catalyst, and
   c3) from 0.0 to 4.0% by weight, based on the weight of component B) and component C), of at least one tertiary amine catalyst,
wherein the amount of components c1), c2), and c3) totals 1 to 4% by weight, based on the weight of component B) and component C).

13. The process of claim 11 wherein said catalyst c1) is selected from the group consisting of dimethyltin dilaurate, bismuth trineodecanoate, dimethyltin dichloride, trimethylhydroxyethylammonium- 2-ethylhexanoate, and mixtures thereof.

14. The process of claim 6, wherein said component b2) is selected from the group consisting of 1,4-butanediol, 2-methyl-1,3-propanediol, cyclohexylamine, dibutylamine, monoethanolamine, diethanolamine, and mixtures thereof.

15. The process of claim 2, wherein said component b3) is selected from the group consisting of n-butanol and 2-ethyl-1-hexanol.

16. The process of claim 4, wherein said component c1) is selected from the group consisting of dimethyltin dilaurate, bismuth trineodecanoate, dimethyltin dichloride, trimethylhydroxyethylammonium- 2-ethylhexanoate, and mixtures thereof.

17. The process of claim 4, wherein said component c2) is selected from the group consisting of dimethyltin dilaurylmercaptide, dibutyltin dilaurylmercaptide, and mixtures thereof.

18. The process of claim 1, wherein said component a1) is prepared from 1,6-hexamethylene diisocyanate and has an isocyanate content of about 21.6% by weight, a monomeric diisocyanate content of <0.2%, a viscosity of about 3000 mPa·s at 25° C.

19. The process of claim 1, wherein said component a2) is prepared from 1,6-hexamethylene diisocyanate, and has an isocyanate content of about 23%, a content of monomeric diisocyanate of <0.7% and a viscosity at 25° C. of 1300–2200 mPa·s.

20. The process of claim 1, wherein said component a6) is prepared from 1,6-hexamethylene diisocyanate, and having an isocyanate content of about 18 to 21%, a viscosity of from 500 to 1500 mPa·s at 25° C., and a monomeric isocyanate content of <0.7% by weight.

21. The process of claim 1, wherein said reaction mixture additionally comprises auxiliaries or additives.

22. The process of claim 21, wherein said auxiliaries or additives comprise at least one compound selected from the group consisting of antioxidants, and UV stabilizers.

23. A process for the production of polyurethane moldings from a reaction mixture by a reaction injection molding process, wherein said reaction mixture comprises:
   A) an aliphatic polyisocyanate based on hexamethylene diisocyanate and having a viscosity of less than about 20,000 mPa·s at 25° C. and having a NCO functionality of 2.3 to 4.0, said polyisocyanate being selected from the group consisting of
      a1) a polyisocyanate containing isocyanurate groups,
      a2) a polyisocyanate containing biuret groups,
      a3) a polyisocyanate containing isocyanurate and allophanate groups, and
      a4) mixtures thereof;
with
   B) an isocyanate-reactive component comprising
      b1) from about 66 to 92% by weight based on the weight of component B) and component C), of at least one organic compound containing at least one of the groups selected from the group consisting of hydroxy groups and amine groups and having an average functionality of from 1 to 4 and a molecular weight of from about 500 to 10,000; and
      b2) from about 7 to 30% by weight, based on the weight of component B) and component C), of an organic chain extender having a molecular weight of from 61 to 500 and being selected from the group consisting of diols, triols, primary amines, secondary amines, amino alcohols, and mixtures thereof, wherein the OH:NH equivalent ratio of said chain extender is from 1:1 to 10:1,
in the presence of
   C) from 1 to 4% by weight, based on the weight of component B) and component C), of at least one catalyst composition comprising
      c1) from 1 to 4% by weight, based on the weight of component B) and component C), of at least one catalyst selected from the group consisting of metal carboxylates, metal halides, ammonium carboxylates, and mixtures thereof,
      c2) from 0.0 to 4% by weight, based on the weight of component B) and component C), of at least one tin-sulfur catalyst, and
      c3) from 0.0 to 4% by weight, based on the weight of component B) and component C), of at least one tertiary amine catalyst;
wherein the amount of c1), c2) and c3) totals 1 to 4% by weight, based on the weight of component B) and component C), and wherein the amount of component B) and component C) totals 100%, and said components are processed via the one-shot process at an isocyanate index of 80 to 130, with the proviso that said aliphatic polyisocyanate contains less than 10% by weight of isophorone diisocyanate.

* * * * *